United States Patent

[11] 3,630,135

| [72] | Inventor | Akihiko Sato |
| | | Tokyo, Japan |
| [21] | Appl. No. | 764,259 |
| [22] | Filed | Oct. 1, 1968 |
| [45] | Patented | Dec. 28, 1971 |
| [73] | Assignee | Nippon Kogaku K.K. |
| | | Tokyo, Japan |
| [32] | Priority | Oct. 13, 1967 |
| [33] | | Japan |
| [31] | | 42/88971 |

[54] FOLDING-TYPE WAIST LEVEL FINDER
3 Claims, 11 Drawing Figs.
[52] U.S. Cl. .................................................. 95/47,
95/11, 95/42, 95/44
[51] Int. Cl. .............................................. G03b 11/04
[50] Field of Search ........................................ 95/44 R, 44
A, 44 B, 42, 11 V, 11, 47; 88/1.5

[56] References Cited
UNITED STATES PATENTS

| 3,007,386 | 11/1961 | Biemeier .................... | 88/1.5 X |
| 2,305,665 | 12/1942 | Bolsey ........................ | 95/42 X |
| 2,640,388 | 6/1953 | Shapiro ...................... | 95/42 X |
| 2,641,955 | 6/1953 | Bretthauer .................. | 95/42 X |
| 2,936,688 | 5/1960 | Myers ......................... | 95/44 X |

*Primary Examiner*—Samuel S. Matthews
*Assistant Examiner*—Richard L. Moses
*Attorney*—Anton J. Wille ABSTRACT: A collapsible or foldable viewing hood is provided for a single lens reflex camera. The viewing hood includes a front cover and a rear cover which are adapted to fold together through a camming arrangement upon rotation of the front cover. A magnifying lens carried in a frame and pivotable supported on the front cover, is folded into the front cover by a camming action of the rear cover. Latches are provided for the cover and for the magnifier frame to retain the folded assembly against the bias of spring elements provided for the covers and the magnifier frame.

FOLDING-TYPE WAIST LEVEL FINDER

This invention relates to a waist-level finder wherein both the rear cover and the magnifier supporting plate can be simultaneously folded by the movement for closing the top lid.

In a conventional waist-level finder, a structure in which a cam groove and pin are combined in order to fold or open the front cover and the rear cover in one action, has been known to those skilled in the art. Viewing hoods with a magnifier lens are also known, but in some instances the magnifier must be manually positioned, or is so arranged that it is difficult and cumbersome to operate; the magnifier being smudged by fingerprints in handling.

The object of the present invention is to provide a collapsible viewing hood for a single lens reflex camera wherein the hood is folded by the rotation of the front cover only and the magnifier is nested within the front cover by the same operation.

In accordance with the invention, the viewing hood includes a front cover and a back cover pivoted on the camera body, a camming arrangement between the two cover permitting the folding of both covers upon rotation of the front cover. A magnifier pivotably supported on the front cover is folded into the front cover by a camming action of the back cover. Latches are provided to retain the covers and magnifier folded against the bias of spring elements provided for the covers and the magnifier. Through slotted shaft supports for the front cover and magnifier, relative motion is permitted for latching and unlatching the covers and the magnifier.

This invention will be described more clearly referring to the illustrative embodiments shown in the attached drawings, in which.

Figure 1:
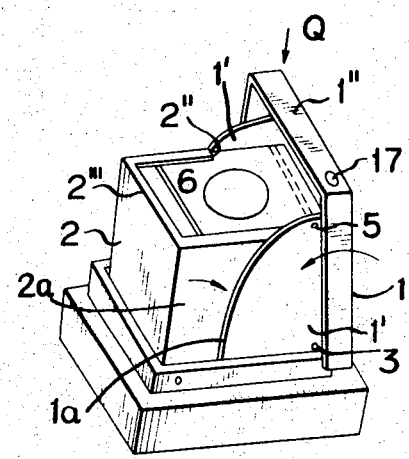
FIG. 1 is a perspective view of the appearance of an embodiment of this invention.
Figure 6:
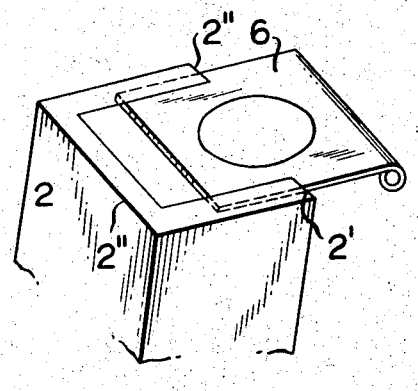
FIG. 6 is a perspective view showing the relation between the magnifier portion and the rear cover.
Figure 8:
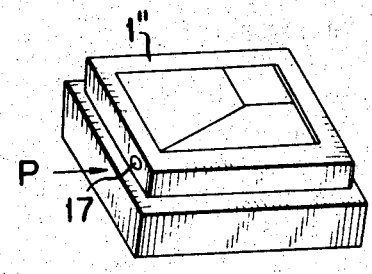

FIGS. 7(a) through 7(d) show in schematic sequence the folding order of the magnifier of FIG. 6; and FIG. 8 is a perspective view of the viewing hood embodiment of FIG. 1, in its folded state.

Figure 4:
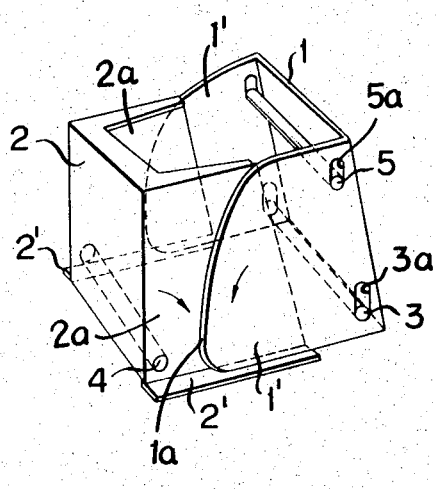
FIG. 4 is a perspective view of the front cover and the rear cover.

Referring to FIGS. 1 and 4, the viewing hood embodying the invention comprises a front cover 1 having spaced apart sidewalls 1' extending rearwardly with respect to a camera (not shown) when the viewing hood is in its erected position. As will hereinafter appear, the lower edges 1a of the sidewalls 1' act as camming surfaces and bear against flanges 2' provided on the lower ends of the spaced sidewalls 2a of the rear cover which are adjacent to the front cover sidewalls. The front cover 1 is supported on a fixed shaft 3 suitably supported by bearings on the camera body, the shaft 3 passing through elongated openings 3a formed in the sidewalls 1'. The rear cover 2 is pivotally supported on a shaft 4 supported in camera body bearings (not shown).

Figure 2:
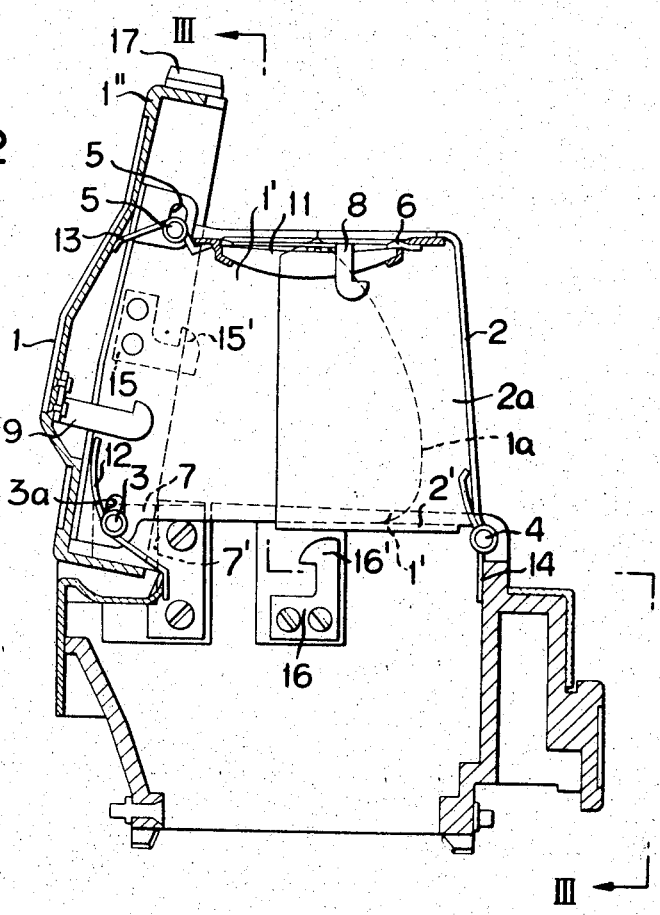
FIG. 2 is a vertical cross-sectional view.
Figure 3:
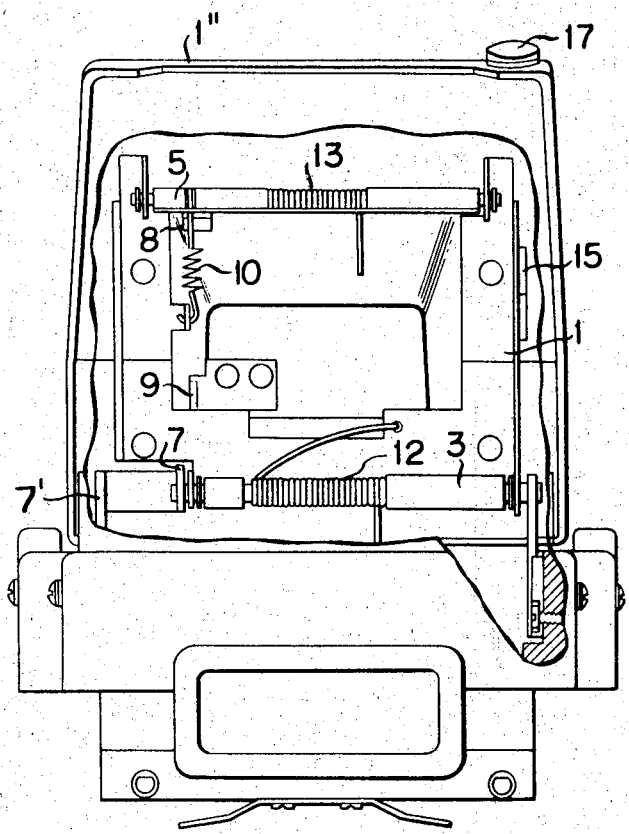
FIG. 3 is a cross-sectional view on line III—III of FIG. 2.
Figure 5:
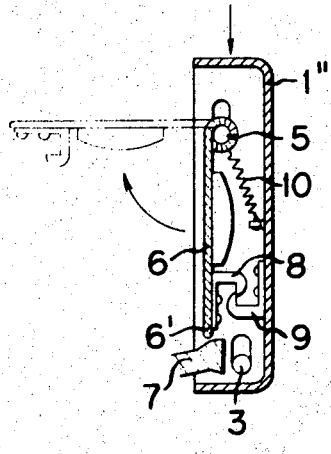
FIG. 5 is a vertical cross-sectional view of the top lid portion.

Referring now to FIGS. 2 and 3, a coil spring 12 is wound about the shaft 3 with one end secured to the camera body and the other end fixed to or abutting the inside surface of the front cover 1 and biasing the cover 1 counterclockwise as viewed in FIG. 2, to its open or unfolded position. The front cover 1 is provided with a lid 1" which forms a recess or a compartment for a magnifying glass 11 supported by a frame 6, the frame being secured at one end to a shaft 5 and pivotally supported thereby. The ends of the magnifier frame shaft 5 are mounted within elongated openings 5a provided in the sidewall 1" as illustrated in FIGS. 2 and 5. Secured to the magnifier support frame 6 is a latching member 8 FIGS. 2 and 3) adapted to cooperate with a similar latching member 9 secured to the lid 1", as will hereinafter appear.

Coiled about the magnifier frame shaft 5 is a coil spring 13, one end of which is secured to the lid 1" (FIG. 2) while the other end is secured to or abuts the magnifier frame 6 to bias the frame in a counterclockwise direction to abut the under surfaces of a flange 2" provided on the upper end of the rear cover sidewalls.

The magnifier frame shaft is biased downwardly (FIGS. 3 and 5) by a coil spring 10 secured at one end to the shaft and at the other end to the inner surface of lid 1" so that the shaft is held in the lower ends of the elongated openings provided in the spaced sidewalls 1'. In this position of the shaft, the latching members 8 and 9 are engaged to hold the magnifier frame within the lid 1', as will hereinafter appear. In this connection, it will be noted that a control member 7 formed with a lug portion 7' is secured to the camera body and is adapted to coact with the free end 6' of the magnifier frame. The back cover 2 is also formed with an edge 2'" which is adapted to coact with the magnifier frame 6.

Secured within the front cover 1 on a sidewall thereof is a latch 15 formed with a hook 15'. A similar latch 16 and formed with a hook 16' is secured within the camera body on a sidewall thereof, the two hooks being positioned to engage and catch to hold the viewing hood in its folded state as illustrated in FIG. 8. A finger tip or pushbutton 17 is provided on the top lid 1" for releasing the two hood hooks 15' and 16' to erect the viewing hood.

When the viewing hood is to be folded, the front cover 1 is rotated counterclockwise (FIG. 4) about shaft 3 against the bias of the spring 12. The edge of the spaced sidewalls 1' of the front cover act as camming surfaces on the flanges 2' of the rear cover 2 thereby rotating the rear cover clockwise about shaft 4 against the bias of the spring 14. As the front cover 1 is moved toward its folded position, the hook 15' and 16' engage each other and the abutting edges provide a camming action to move one hook passed to the other thereby moving the lid 1 forward with respect to the camera body or to the left as viewed in FIG. 2; the elongated openings for the shaft 3 permitting this forward motion against the bias of spring 12. When the hooks 15' and 16' slide past each other, the bias of the spring 12 takes over to move the front cover 1 toward the rear to engage the hooks and latch the hood in its folded position.

It will be understood that the magnifier frame 6 with the viewing hood erected is in an approximately horizontal position as illustrated in FIGS. 1, 2, 5 and 6. As the rear cover 2 is rotated counterclockwise (FIG. 2) against the bias of the spring 14, the magnifier frame 6 held by the bias of spring 13 against the underside of flange 2" of the back cover, is rotated clockwise about its shaft 5 by the counterclockwise rotation of the back cover 2.

Figure 7A:
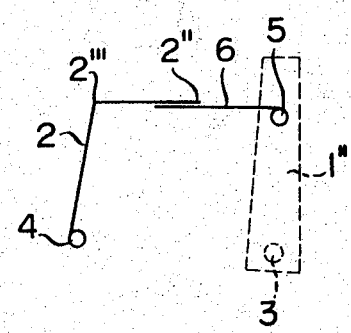

Referring in particular to FIGS. 6 and 7(a) through 7(d), the folding operation of the viewing hood is shown in various phases, FIG. 7(a) illustrating the viewing hood in its erect position. After the folding operation has been initiated, the back cover 2 is rotated counterclockwise by the camming action of the front cover sidewalls 1" on flanges 2' of the back cover.

Figure 7B:
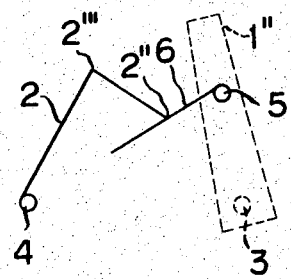
Figure 7C:
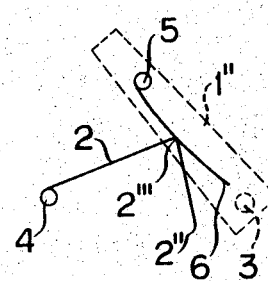
Figure 7D:
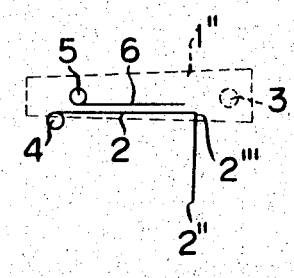

The magnifier frame is carried by the lid 1" as illustrated in FIGS. 7(b) and is rotated at the same time in a counterclockwise direction about its shaft 5 against the bias of the spring 13. A point is reached during the folding operation as illustrated in FIG. 7(c) where the edge 2'" of the back cover 2 engages the magnifier frame to rotate the mirror frame 6 within the lid 1". The continued counterclockwise rotation of the front cover lid finally nests the back cover 2 and magnifier frame 6 within the lid as illustrated in FIG. 7(d). The folded viewing bond will have the appearance as illustrated in FIG. 8.

As the magnifier frame 6 is folded into the cover lid 1" from the position illustrated in FIG. 7(c) to the position in FIG. 7(d), the hooked latches 8 and 9 on the frame and front cover lid, respectively, abut each other. The lower edge 6' of the magnifier frame engages the control member 7 to move the frame 6 upwardly (FIG. 5) against the bias of spring 10, the upward movement being permitted by the elongated openings for the shaft 5. This upward movement of frame 6, or relative downward movement of cover lid 1'', will slide the two hooked latch members past each other to latch the magnifier frame within the cover lid as the spring 10 again biases the shaft 5 to the lower ends of the elongated openings.

To erect the viewing hood, the button 17 is depressed in the direction P in FIG. 8 against the bias of spring 12. This will release the hooks 15' and 16' of the latching members and permit the spring 12 to rotate the front cover 1 in a counterclockwise direction as seen in FIG. 2, until the lug portion 7' of the control member 7 is engaged. The release of the front cover 1 will permit the spring 14 to erect the back cover 2. The hood is now erected for viewing.

If is is desired to use the magnifier 11, the front cover lid 1'' is depressed in the direction Q as shown in FIGS. 1 and 5. The front cover lid due to the elongated slots provided for the shaft 5 will be moved relative to the magnifier frame 6 due to the abutment of frame end 6' and control member 7, to permit the unhooking of the latch members 8 and 9 (FIG. 5). With the release of the latch members, the spring 11 will rotate the frame in a clockwise direction to the phantom line position.

What is claimed is:

1. A foldable viewing hood for a reflex camera comprising a front cover hinged on the front side of the hood body to rotate between erected and folded positions thereof and having a pair of spaced sidewalls, a magnifier supporting plate hinged on said front cover and rotatable between a viewing position and retracted position in which said plate is parallel with side front cover, a rear cover hinged on the rear side of the hood body rotatable between erected and folded positions in accordance with the movement of said front cover and having a pair of spaced sidewalls adjacent respective sidewalls of said front cover, an upper projection on the upper end portion of at least one sidewalls of said rear cover, and being slidably engageable with said magnifier supporting plate, a first spring urging said rear cover to its erected position, a cam being formed by the edge of at least one of said sidewalls of said front cover, a lower projection on the lower end portion of the rear cover sidewall adjacent said one front cover sidewall engaging said cam due to the bias of said first spring, and a second spring urging said magnifier supporting plate to its viewing position, said magnifier supporting plate being simultaneously moved by said upper projection from its viewing position to its retracted position upon movement of said rear cover to its folded position.

2. A foldable viewing hood according to claim 1, wherein said upper and lower projections are bent portions of one of said sidewalls of said rear cover, said upper projection being bent inwardly and said lower projection outwardly.

3. A foldable viewing hood according to claim 1 wherein said front cover is hinged to the hood by a shaft fixed on the front side of the hood body, said spaced sidewalls of the front cover being formed with a first pair of elongated openings for receiving said shaft, a third spring urging said front cover to its erected position in which said fixed shaft is engaged with one end of said respective openings, said magnifier supporting plate being hinged on said front cover by a movable shaft secured to one end of said supporting plate, the spaced sidewalls of the front cover being formed with a second pair of elongated openings to receive the ends of said movable shaft, a fourth spring urging said movable shaft to the one end of said second pair of openings, a first latch for retaining said front cover in its folded position consisting of a first hooked member on the hood body and a second hooked member on said front cover, a second latch for retaining said magnifier supporting plate in its retracted position consisting of a third hooked member on said front cover and a fourth hooked member on said magnifier supporting plate, and a releasing member for said magnifier supporting member fixed on the hood body and engageable with the free end of said magnifier supporting plate only when said front cover is erected, said front and rear covers being permitted to rotate to the erected position by the sliding movement of said front cover is permitted to rotate to its viewing position by the sliding movement of said front cover in its open position.

* * * * *